(12) United States Patent
Duldhardt

(10) Patent No.: US 6,779,731 B2
(45) Date of Patent: Aug. 24, 2004

(54) PRODUCT CARE LABEL FOR TEXTILES AND METHOD FOR PRODUCING IT

(75) Inventor: Marianne Duldhardt, Berlin (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 09/808,062

(22) Filed: Mar. 14, 2001

(65) Prior Publication Data

US 2001/0017322 A1 Aug. 30, 2001

Related U.S. Application Data

(63) Continuation of application No. PCT/EP99/06710, filed on Sep. 10, 1999.

(30) Foreign Application Priority Data

Sep. 14, 1998 (DE) .......................................... 198 42 366

(51) Int. Cl.[7] .............................................. G06K 19/06
(52) U.S. Cl. ....................... 235/492; 235/375; 68/12.02; 340/572.1; 134/57 R
(58) Field of Search ................................ 235/375, 376, 235/487, 492; 8/158, 147, 159; 68/12.02, 12.01; 455/90; 361/813; 340/572.1; 343/895; 134/56 R, 57 R

(56) References Cited

U.S. PATENT DOCUMENTS

| | | | |
|---|---|---|---|
| 5,388,299 A | * | 2/1995 | Lee .................... 8/159 |
| 5,420,757 A | * | 5/1995 | Eberhardt et al. .......... 361/813 |
| 5,574,470 A | * | 11/1996 | de Vall ........................ 343/895 |
| 5,644,936 A | * | 7/1997 | Yasutake et al. ............ 68/12.02 |
| 5,715,555 A | * | 2/1998 | Reber et al. ................... 8/158 |
| 5,756,986 A | * | 5/1998 | Gustafson ................... 235/492 |
| 5,973,598 A | * | 10/1999 | Beigel ...................... 340/572.1 |
| 6,078,791 A | * | 6/2000 | Tuttle et al. .................. 455/90 |
| RE37,956 E | * | 1/2003 | Blama ..................... 235/492 X |
| 6,535,128 B2 | * | 3/2003 | Richman ................ 340/572.1 |
| 2002/0170952 A1 | * | 11/2002 | Alsafadi et al. ............ 235/375 |
| 2003/0229404 A1 | * | 12/2003 | Howard et al. ............... 700/17 |

FOREIGN PATENT DOCUMENTS

| | | | |
|---|---|---|---|
| DE | 197 47 152 A1 | * | 4/1999 |
| DE | 101 44 667 A1 | * | 3/2003 |
| EP | 0 911 710 A2 | * | 4/1999 |
| EP | 0 943 722 A1 | * | 9/1999 |
| GB | 2 073 550 A | * | 10/1981 |
| WO | WO 96/08596 A1 | * | 3/1996 |
| WO | WO 99/45493 A2 | * | 9/1999 |
| WO | WO 03/010712 A1 | * | 2/2003 |

* cited by examiner

Primary Examiner—Jared J. Fureman
(74) Attorney, Agent, or Firm—Laurence A. Greenberg; Werner H. Stemer; Gregory L. Mayback

(57) ABSTRACT

A product care label to be attached to a textile product includes a textile carrier part with printed-on or woven-in care instructions reproducing information on the suitable treatment of the textile product and at least one transponder having an electronic component applied thereto. The transponder contains information on the suitable treatment of the textile product, with the information corresponding to the care instructions. Thus, machine readability of the care instructions is achieved and the situation where textile products are damaged due to improper treatment is avoided. A method for producing the product care label includes the steps of printing at least one of a care symbol and a care instruction onto a carrier tape, and simultaneously attaching at least one transponder onto the carrier tape.

20 Claims, 1 Drawing Sheet

US 6,779,731 B2

PRODUCT CARE LABEL FOR TEXTILES AND METHOD FOR PRODUCING IT

CROSS-REFERENCE TO RELATED APPLICATION

This application is a continuation of copending International Application No. PCT/EP99/06710, filed Sep. 10, 1999, which designated the United States.

BACKGROUND OF THE INVENTION

1. Field of the Invention

The invention lies in the field of textiles. The invention relates to a product care label intended to be attached to textiles and having a textile carrier part with printed-on or woven-in care instructions containing information on suitable treatment of the textile product, and to a method for producing the product care label.

The treatment of textiles, but, in particular, the washing and drying of articles of clothing, is one of the tasks of daily life that occur frequently. These routine cleaning processes must proceed as optimally as possible to ensure that the textiles maintain their value. Incorrect treatment may not only damage an article of clothing, but, in extreme cases, even destroy it completely. For reasons of cost, but also to save time, laundry articles are not treated individually, but are combined into laundry batches. Such combined laundry articles are then washed together in a washing machine. When such laundry batches are put together, it is very important to combine only textiles that have identical or similar properties, such as type of cloth, permitted washing temperature or color, so that a variation in the textiles such as, for example, dye run, shrinkage, or felting, can be avoided during washing.

New cloth compositions, such as, for example, combinations of the natural products silk and linen, which both independently have completely different care profiles, require the user to have increasingly more comprehensive and specialized knowledge for proper care and so that the articles maintain their value. The same applies to modern microfibers and GORETEX® materials, for example, which are used mainly for the production of sports and leisure clothing. These materials combine the advantageous features of a wide variety of conventional cloths, such as, for example, low weight, high wearing comfort and breathability, with the possibility of cleaning the laundry articles in the user's own washing machine.

So that textiles with different colors and cloth compositions can undergo as optimal a cleaning process as possible and, consequently, meet their different care requirements, product care labels have been in existence for a long time. The care labels usually are made of textile or plastic strips or tabs, onto which care instructions in the form of symbols are printed, woven, or embroidered during the production process. The labels contain instructions for the treatment of the associated textile product. Care symbols are used, for example, to define the maximum washing or ironing temperature or to recommend or rule out hand washing or chemical cleaning. The care labels are sewn in at a concealed location, preferably, on the inside of an article of clothing, for example, at a seam of a shirt. A user must read the care labels and interpret their particulars. However, because of the different fabric compositions and colors, there are a large number of different care symbols, the meaning of which is not always known to the user. An accurate explanation of the meaning of the care symbols is usually difficult in practice, and because of the uncertainty, as a rule, unknown care symbols are ignored and the laundry article is added to a laundry batch of presumably the same kind. However, the treatment program subsequently selected on the washing machine may prove unsuitable and the individual laundry article or, in extreme cases, for example, due to dye running, the entire laundry batch may be damaged.

To identify articles of clothing, machine-readable electronic storage elements, i.e., transponders, which contain information on the textile product, exist in the textile industry. A voltage is induced in the transponder by electromagnetic radiation and ensures that the transponder transmits the stored information, which can be processed subsequently by a corresponding receiver. The sales route of articles of clothing so marked from the manufacturer by way of several intermediate dealers to the ultimate purchaser can be covered by a chain of readers and receivers. However, such transponders contain only product information that is important for sale and dispatch. All articles of clothing are additionally provided with conventional product care labels that contain information essential to the user on the care requirements of the textile product in printed-on, woven-in, or embroidered-in form. It is a particular disadvantage that the transponders and conventional product care labels have to be attached to the textile product in two separate and, therefore, cost-intensive work steps.

SUMMARY OF THE INVENTION

It is accordingly an object of the invention to provide a product care label for textiles and method for producing it that overcomes the hereinafore-mentioned disadvantages of the heretofore-known devices and methods of this general type and that makes possible the simultaneous fastening of product care labels and transponders to textile products in the simplest possible way.

With the foregoing and other objects in view, there is provided, in accordance with the invention, a product care label to be attached to a textile product, including a textile carrier part having at least one care instruction including information on suitable care of a textile product, and at least one transponder having an electronic component. The transponder is attached to the textile carrier part and the electronic component holds information corresponding to the at least one care instruction.

In accordance with another feature of the invention, the information held by the electronic component is electronic information.

In accordance with a further feature of the invention, the textile carrier part is printed-on or woven-in the textile product.

In accordance with an added feature of the invention, the electronic component is applied to or printed on the textile carrier part.

In accordance with another feature of the invention, the electronic information corresponds to all care instructions of the textile product.

In accordance with a further feature of the invention, the at least one care instruction is care symbols, and each care symbol is associated with a respective different transponder.

In accordance with an added feature of the invention, the electronic component is a flat chip or a flat coil.

In accordance with an additional feature of the invention, the at least one transponder has a synthetic resin encasing the electronic component.

With the objects of the invention in view, there is also provided a method for producing a product care label for textiles, including the steps of printing at least one of a care symbol and a care instruction onto a carrier tape, and simultaneously attaching at least one transponder onto the carrier tape. The carrier tape can be a textile or plastic tape.

In accordance with another mode of the invention, the attaching step is performed by simultaneously applying or printing at least one transponder to or on the carrier tape.

In accordance with a further mode of the invention, a flat chip or flat coil of the at least one transponder is pressed or introduced into a synthetic resin casing.

In accordance with a concomitant mode of the invention, the attaching step is performed by fastening the at least one transponder on or to the carrier tape with an adhesive.

According to the invention, a product care label of the type initially mentioned is provided, in which at least one transponder having an electronic component is applied to or printed on the product care label and contains the information corresponding to the care instruction or to the care instructions. It is thereby possible to make machine-readable treatment recommendations that relate to the textile products and are contained in the care symbols. After a voltage is induced, the transponder transmits the information on the textile product that is stored in it. A treatment operation is started by a suitable household appliance, such as, for example, a washing machine or a laundry dryer. The household appliance has an integrated or separate reader for the transponder information. The treatment operation is optimally coordinated with the laundry batch to be treated. Therefore, the user does not have to take the trouble to enter the information.

It is particularly advantageous if each symbol has its own transponder because the product care label usually has printed on it a plurality of care symbols that give the user various care instructions relating to the textile product. Many care symbols, such as, for example, the symbol indicating the maximum washing temperature, are used relatively often and are, therefore, better understood than others. Unknown care symbols are often ignored by the user, especially because it is often difficult, in daily practice, to explain the exact meaning of the care symbols. All the care labels of the laundry article are detected by the household appliance through the information in the at least one transponder so that the lay user does not run the risk of spoiling the laundry batch with a laundry article that does not match the other textile products. An unsuitable care program selected by the user is not started or the user is advised of the incorrect selection.

The transponder may have a flat chip or a coil. Such a configuration has the advantage that it is very small and can easily be handled. The small size and the inconspicuousness nature of the transponder ensure that the transponder is not detrimental to the comfort of wearing the article of clothing identified. Furthermore, such a transponder affords the advantage that it can be manufactured very cost-effectively and in large numbers so that the price of the textile product does not have to be increased due to the use of transponders for identification.

It is advantageous, moreover, if particularly resistant material, such as, for example, synthetic resin, is used for the casing of the chip or coil of the transponder. A transponder is, thus, provided that is insensitive even to aggressive detergent or the highest possible washing and ironing temperatures. Such a configuration optimally protects the inner, more sensitive, store element of the transponder against all external influences, such as, scratching or crushing.

The invention also relates to a method for producing a product care label for textiles, in which at least one care symbol and/or instruction is printed onto a carrier part, in particular, onto a textile or plastic tape. At least one transponder simultaneously is applied to or printed onto the carrier tape.

It is particularly advantageous if a flat chip or a flat coil is pressed or introduced into a synthetic resin casing because the synthetic resin has the necessary strength against mechanical and thermal stress.

A transponder can be fastened on or to the carrier part with an adhesive. Such fastening ensures that the transponder does not come loose from the product care label during washing and spinning. The fastening effectively prevents the user information contained in the transponder from being lost.

Other features that are considered as characteristic for the invention are set forth in the appended claims.

Although the invention is illustrated and described herein as embodied in a product care label for textiles and method for producing it, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
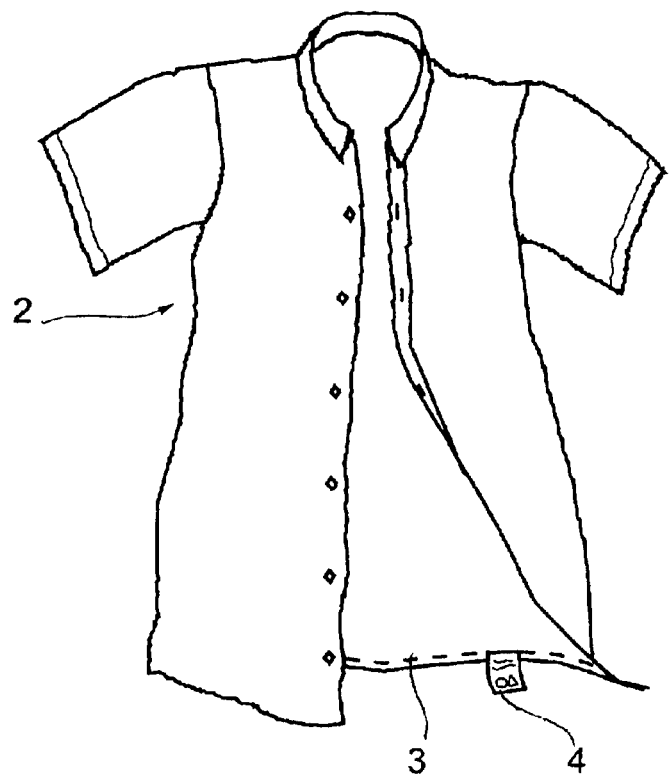
FIG. 1 is a diagrammatic, perspective view of a textile product to be treated having a sewn-in product care label according to the invention.

In all the figures of the drawing, sub-features and integral parts that correspond to one another bear the same reference symbol in each case.

Referring now to the figures of the drawings in detail and first, particularly to FIG. 1 thereof, there is shown a washable textile product 2 that is, for example, a white shirt. The textile product 2 has a product care label 4 at an inner seam 3.

Figure 2:
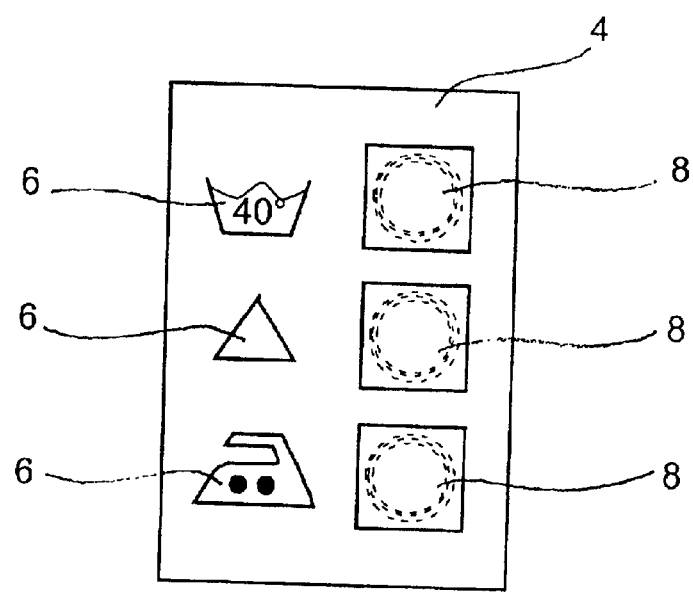
FIG. 2 is a diagrammatic plan view of a product care label for identifying the textile product of FIG. 1 with care symbols and transponders.

FIG. 2 shows, on an enlarged scale, the product care label 4, which, in the example, has three care symbols 6 relating to the washing temperature, to the bleaching operation, and to the ironing temperature. Moreover, the product care label 4 has three transponders 8, each of which is assigned to one of the care symbols 6.

Providing a separate transponder 8 for each care symbol 6 also increases production flexibility because, in the case of different textiles, often only a few care symbols change in relation to others. Thus, only a few of the transponders 8 have to be replaced by suitable ones. The configuration also contributes to a cost-effective mass production of the individual transponders 8.

Such transponders can be applied to the fabric strips, during the production of the care labels, in the same operation as the printing on of the care instructions or care symbols. First, for example, a drop of resin is applied to the relevant location on the fabric and partially penetrates into the fabric. A very thin transponder disk is then laid on and is subsequently covered with a second drop of resin. The two drops of resin can bond with one another when their edges project beyond the transponder and, thereby, finally enclose the transponder in the coalesced drop of resin. It is particularly advantageous for the wearing comfort of the article of clothing and for the durability of the transponder if the transponder is produced from flexible materials.

I claim:

1. A product care label to be permanently attached to a textile product, comprising:

a textile carrier part having a plurality of care symbols including visually recognizable information on suitable care of a textile product;

a plurality of transponders each attached to said textile carrier part, each having a respective electronic component, and each being associated with a respective one of said care symbols;

each respective electronic component holding information corresponding to a respective care symbol; and each of said plurality of transponders configured to transmit the information to a corresponding household appliance.

2. The product care label according to claim 1, wherein said information held by said electronic component is electronic information.

3. The product care label according to claim 1, wherein said textile carrier part is printed-on the textile product.

4. The product care label according to claim 1, wherein said textile carrier part is woven-in the textile product.

5. The product care label according to claim 1, wherein said electronic component is applied to said textile carrier part.

6. The product care label according to claim 1, wherein said electronic component is printed on said textile carrier part.

7. The product care label according to claim 1, wherein said electronic component is a flat chip.

8. The product care label according to claim 1, wherein said electronic component is a flat coil.

9. The product care label according to claim 1, wherein said plurality of transponders have a synthetic resin encasing said electronic component.

10. The product care label according to claim 1, wherein said plurality of transponders are configured to be detected by a household appliance.

11. A method for producing a product care label for textiles, which comprises:

printing a plurality of visually recognizable care symbols onto a carrier tape;

simultaneously attaching a plurality of transponders onto the carrier tape with each care symbol being associated with a respective transponder; and configuring each of the plurality of transponders for transmitting information to a corresponding household appliance.

12. The method according to claim 11, wherein carrier tape is a plastic tape.

13. The method according to claim 11, wherein carrier tape is a textile tape.

14. The method according to claim 11, wherein the attaching step is performed by simultaneously applying the plurality of transponders to the carrier tape.

15. The method according to claim 11, wherein the attaching step is performed by simultaneously printing the plurality of transponders on the carrier tape 16. The method according to claim 11, which further comprises pressing a flat chip of the plurality of transponders into a synthetic resin casing.

17. The method according to claim 11, which further comprises introducing a flat chip of the plurality of transponders into a synthetic resin casing.

18. The method according to claim 11, which further comprises pressing a flat coil of the plurality of transponders into a synthetic resin casing.

19. The method according to claim 11, which further comprises introducing a flat coil of the plurality of transponders into a synthetic resin casing.

20. The method according to claim 11, wherein the attaching step is performed by fastening the plurality of transponders on the carrier tape with an adhesive.

* * * * *